(12) United States Patent
Gerry

(10) Patent No.: US 6,993,396 B1
(45) Date of Patent: Jan. 31, 2006

(54) SYSTEM FOR DETERMINING THE HEALTH OF PROCESS CONTROL FEEDBACK LOOPS ACCORDING TO PERFORMANCE ASSESSMENT CRITERIA

(76) Inventor: John Peter Gerry, 4734 Sonseeahray Dr., Hubertus, WI (US) 53033

( * ) Notice: Subject to any disclaimer, the term of this patent is extended or adjusted under 35 U.S.C. 154(b) by 132 days.

(21) Appl. No.: 10/393,210

(22) Filed: Mar. 20, 2003

(51) Int. Cl.
G05B 13/02 (2006.01)

(52) U.S. Cl. .................. 700/36; 700/21; 700/28; 700/44; 700/45; 700/46; 700/100; 700/106; 705/5; 705/6; 705/8; 705/10; 705/11

(58) Field of Classification Search .................. 700/21, 700/28, 44–45, 79, 36–37, 46; 702/45–47, 702/50, 100, 101–106, 182–183; 705/5–6, 705/8, 10, 11
See application file for complete search history.

(56) References Cited

U.S. PATENT DOCUMENTS

| 4,308,835 A | * | 1/1982 | Abbey ..................... 123/439 |
| 4,380,146 A | * | 4/1983 | Yannone et al. ............ 60/790 |
| 4,649,515 A | | 3/1987 | Thompson |
| 5,301,101 A | * | 4/1994 | MacArthur et al. .......... 700/36 |
| 5,838,561 A | * | 11/1998 | Owen ....................... 700/32 |
| 5,855,791 A | * | 1/1999 | Hays et al. ................. 210/696 |
| 6,023,222 A | * | 2/2000 | Brossmer et al. ........... 340/511 |
| 6,038,540 A | * | 3/2000 | Krist et al. .................. 705/8 |
| 6,128,606 A | * | 10/2000 | Bengio et al. ............... 706/10 |
| 6,298,454 B1 | | 10/2001 | Schleiss |
| 6,459,939 B1 | | 10/2002 | Hugo |
| 6,510,353 B1 | * | 1/2003 | Gudaz et al. ............... 700/37 |
| 6,615,090 B1 | * | 9/2003 | Blevins et al. .............. 700/26 |
| 6,633,782 B1 | * | 10/2003 | Schleiss et al. ............. 700/26 |
| 6,690,889 B2 | * | 2/2004 | Desthieux et al. .......... 398/147 |
| 6,754,594 B2 | * | 6/2004 | Henry et al. ................ 702/45 |
| 6,865,511 B2 | * | 3/2005 | Frerichs et al. ............. 702/182 |
| 2003/0120359 A1 | * | 6/2003 | O'Leary et al. ............. 700/19 |
| 2004/0136379 A1 | * | 7/2004 | Liao et al. ............. 370/395.21 |

OTHER PUBLICATIONS

Paulonis & Cox "A Practical Approach for Large-Scale Controller Performance Assessment, Diagnosis and Improvement", Journal of Process Control 13 (2003) 155-168 (Copy Supplied).

* cited by examiner

Primary Examiner—Ramesh Patel
(74) Attorney, Agent, or Firm—Henry L. Smith, Jr.

(57) ABSTRACT

A method for calculating the health of a process control loop based on multiple key assessments of the loop's performance. The method uses the concepts of baselines and thresholds. The typical calculation of loop health is the average of the Percent Towards Threshold for all the assessments divided by the economic significance of the loop.

8 Claims, 4 Drawing Sheets

Chart A
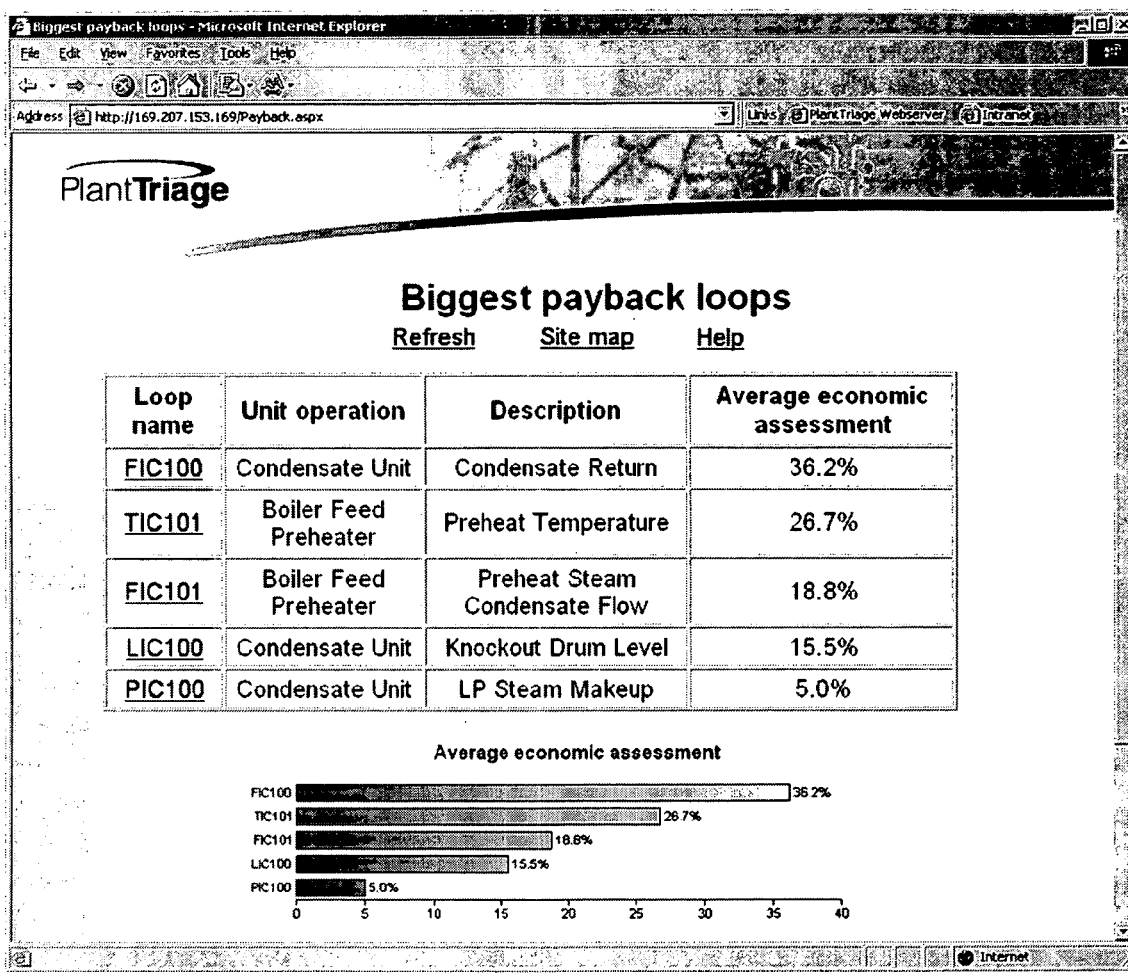

SYSTEM FOR DETERMINING THE HEALTH OF PROCESS CONTROL FEEDBACK LOOPS ACCORDING TO PERFORMANCE ASSESSMENT CRITERIA

STATEMENT REGARDING FEDERALLY SPONSORED RESEARCH AND DEVELOPMENT

None.

BACKGROUND

1. Field of Invention

The use of application software, running on personal computers, to perform engineering computational tasks is becoming common. One task is to evaluate the health of a process control loop in industrial process situations.

A control loop has 3 main parts. These parts are: (1) the measurement of a process variable like flow, temperature or pressure, (2) a modulating control valve, variable speed pump or other manipulated device, (3) a controller that reads the measurement (part 1) and computes an output to the manipulated device (part 2).

Loop health is a combination of performance assessment criteria determined by the user. Loop health is the assessment of how a control loop is performing based on a definition of performance chosen by the end user. For example, a control loop consisting of a valve, flow measurement and controller may be considered to be performing well if the loop's flow measurement is consistently close to the set point over a period of time. A possible assessment could be the average value of the error (or difference) between the set point and flow measurement for a certain period of time. Another assessment may be the standard deviation of the measurement over a certain period of time. A third example of an assessment is the percentage time that the output of the control loop is at an extreme or limited value. The loop health could be specified by the user as any one of these assessments or some combination of them.

A processing plant like an oil refinery may have hundreds to thousands of control loops. Assessing the health of the loops can help the processing plant determine where to concentrate maintenance efforts. The problem is how to interpret multiple assessments and combine these into an overall assessment or health of the loop.

One approach to measuring loop health is to perform a weighted sum of several assessments. The disadvantage of this approach is that it is unclear how to compare the relative health of one loop to another. An assessment that is large for one loop may be normal, while the same value on another would indicate a problem.

There is a need for obtaining the relative health of control loops so they can be compared for the purpose of prioritizing them. It will be more important for the plant to schedule resources to concentrate on those loops with the poorest health.

2. Description of Prior Art

Over the years numerous methods have been developed to optimize processes in industrial plants. Many of these methods have focused on process control loops involving sensors which sense what is going on in the process, and controllers which change or regulate some parameter of the process such as flow rate, temperature, pressure, proportions for mixing chemicals, etc. Representative of prior art are the following patents. U.S. Pat. No. 4,649,515, Mar. 10, 1987 to Thompson et al. involves monitoring and diagnosing sensor and interactive based process systems. The knowledge base concerning the process system is in the form of a list in stored memory including evidence-hypothesis rules. The system detects malfunctions in an industrial system and modifies the operation of the system and provides users with information about probable causes of malfunctions in the system. U.S. Pat. No. 5,838,561, Nov. 17, 1998 to Owen involves a method of diagnosing a malfunction in a process control system which includes at least one closed loop control loop and comprises measuring a histogram of control loop tracking error, determining distortion of tracking error relative to a Gaussian distribution and indicating a malfunction when a deviation from the Gaussian distribution of tracking error exceeds predetermined limits. U.S. Pat. No. 6,298,454, Oct. 2, 2001 to Schleiss et al. involves a diagnostic tool which collects data involving a variability parameter, mode parameter, status parameter and limit parameter associated with each of the different devices, loops, or function blocks in a process control system and indicates to an operator a list of detected problems in the system. U.S. Pat. No. 6,459,939, Oct. 1, 2002 to Hugo involves a method for determining the performance of model predictive controllers requiring only closed loop data and an estimate of process deadtime. A good overview of the field is found in an article entitled "A practical approach for large-scale controller performance assessment, diagnosis and improvement" by Michael A. Paulonis and John W. Cox, Journal of Process Control, 13 (2003) 155–168. The above inventions have to do with either a calculation of specific assessments, or they provide an approach for combining several assessments that makes it difficult to compare loops to other loops. When looking at several loops, the health of a loop relative to other loops is important to process plants.

SUMMARY OF INVENTION

The invention is a method for determining the health of a process control feedback loop (hereafter called loop) according to performance assessment criteria.

Others have devised methods for determining loop health. What is novel about this invention is the particular method for determining the health of the loop.

This invention applies to control loops and primarily in the process industries. The process industries include these industries: oil refining, chemical processing, pulp and paper production, metals and mining, food, semiconductors etc.

The invention is a method for calculating the health of a control loop based on multiple key assessments. The method uses the concepts of baselines and thresholds.

A baseline is a reference value of an assessment. For example the baseline for the average error assessment might be zero. Ideally the baselines would correspond to a time when the loop and plant were optimized and running well. In practice, the baselines will probably correspond to a starting point or reference value to compare against in the future.

The threshold is a second reference value for an assessment. Thresholds represent limits or boundaries between which the assessments would remain if the plant is running well. A threshold can be bidirectional, meaning there can be a threshold above the baseline and one below the baseline value.

Key assessments are those assessments the user would like to include in the calculation of loop health. Examples of assessments would be the average value of the error (or difference) between the set point and measurement for a certain period of time. Another assessment may be the standard deviation of the measurement over a certain period of time. A third example of an assessment is the percentage time that the output of the control loop is at an extreme or limited value.

The Economic Significance is the relative economic or commercial importance of the loop. Less important loops will have a higher number. More important loops will have a lower value. The Economic Significance is a divisor. It is a floating point number. For example the Economic Significance could have 3 levels: high, average and low. The high value could be 1, the average value 2 and the low value 4.

In this invention that calculation of loop health is the average of the Percent Towards Threshold for all the assessments divided by the Economic Significance. The Percent Towards Threshold calculation is detailed in Equation 1. All of the Percents Towards Threshold for the key assessments for a loop are averaged together. The resultant average is divided by the Economic Significance. This final result is the measure of loop health. This is explained in detail in the detailed description section of this patent Application.

Loop health of an entire group or area is found by averaging the loop health of all the loops in that group or area. For example, the health of a unit operation can be measured by averaging the health of all the loops in the unit operation. The health of the entire facility is measured by averaging the health of all the loops in the facility.

The invention of the Application can easily be implemented by a computer program by methods well known to those skilled in the art and based on a number of commonly available processes including C++, Basic, Fortran, and Pascal.

OBJECTS AND ADVANTAGES

The objects of the present invention are:
1. It is an object of the invention to provide a consistent calculation of loop health for a process plant.
2. It is another object of the invention to provide a measure of loop health based on a composite of any number of assessments.
3. Organizations can customize their own definition of loop health in a way that is meaningful to their business and operation.
4. Since thresholds can be set above or below the baseline value, it is possible for either an increasing or decreasing assessment to contribute to loop health positively or negatively. For example, the assessment of average error may be considered poor if the average error is high. In this case, a proper setting for the threshold would be a value greater than the baseline value. However, a different assessment may be considered poor if the value of the assessment is low. In this case a low threshold will be set. An example of an assessment like this may be the "% of Time That a Loop Is in Automatic Mode". Usually a loop is considered running better the more time it is in automatic. So a small value for this assessment would be considered poor, requiring a low threshold be set.

DETAILED DESCRIPTION OF THE DRAWINGS AND OPERATION OF THE INVENTION

Figure 1:
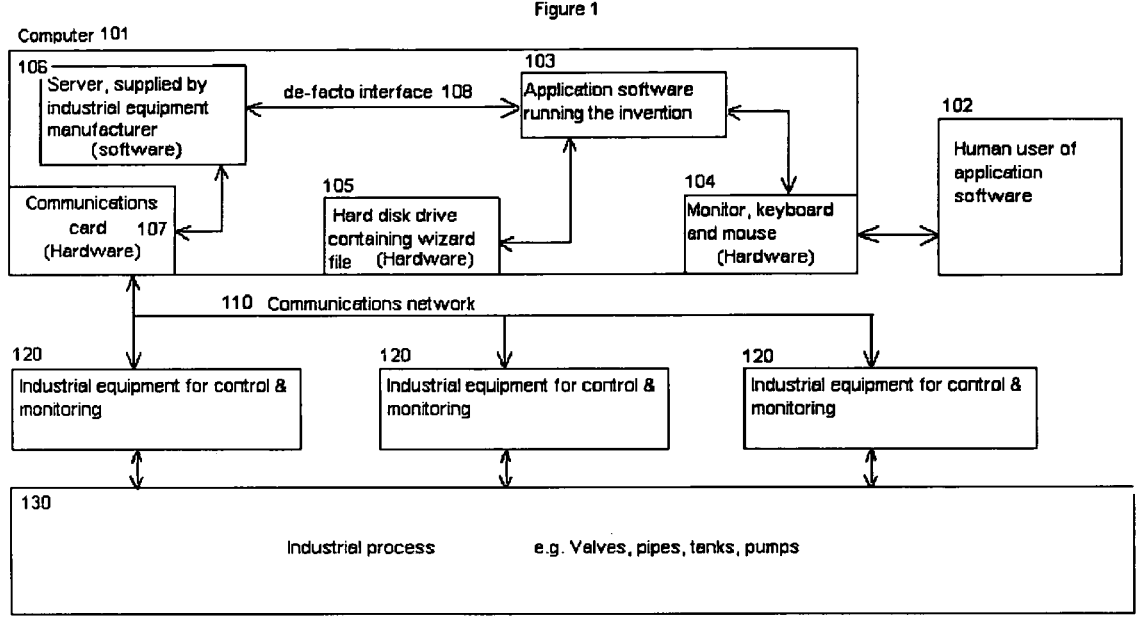
FIG. 1 is an overall view of the software running the invention, together with associated computer hardware and communications network, and the industrial equipment for control and monitoring the industrial process.

FIG. 1 is a diagram of a system where the invention may be implemented. A personal computer (101) contains a number of hardware and software components. The invention can be implemented in any computer containing the hardware components and can be coded in any programming language. A human user (102) of the computer activates and runs the application software (103) by means of a monitor, keyboard and mouse (104). The application software calculates assessments and stores baselines and thresholds on the hard disk (105) of the computer. The application software's primary task is to perform mathematical calculation or other functions on data values that represent the state of some kind of industrial process (130). These data values will be represented by values inside a number of industrial control and monitoring equipment (120) units. The manufacturer of the industrial control and monitoring equipment units, or others, will have supplied and installed hardware and software components to allow application software to access these data values. These hardware and software units comprise a communications network (110), a communications card or other hardware device (107) mounted in the computer, and Server software (106) that drives and communicates with the communications card. The Server software communicates with the application software by means of a de-facto software interface (108) that is commonly used.

Figure 2:
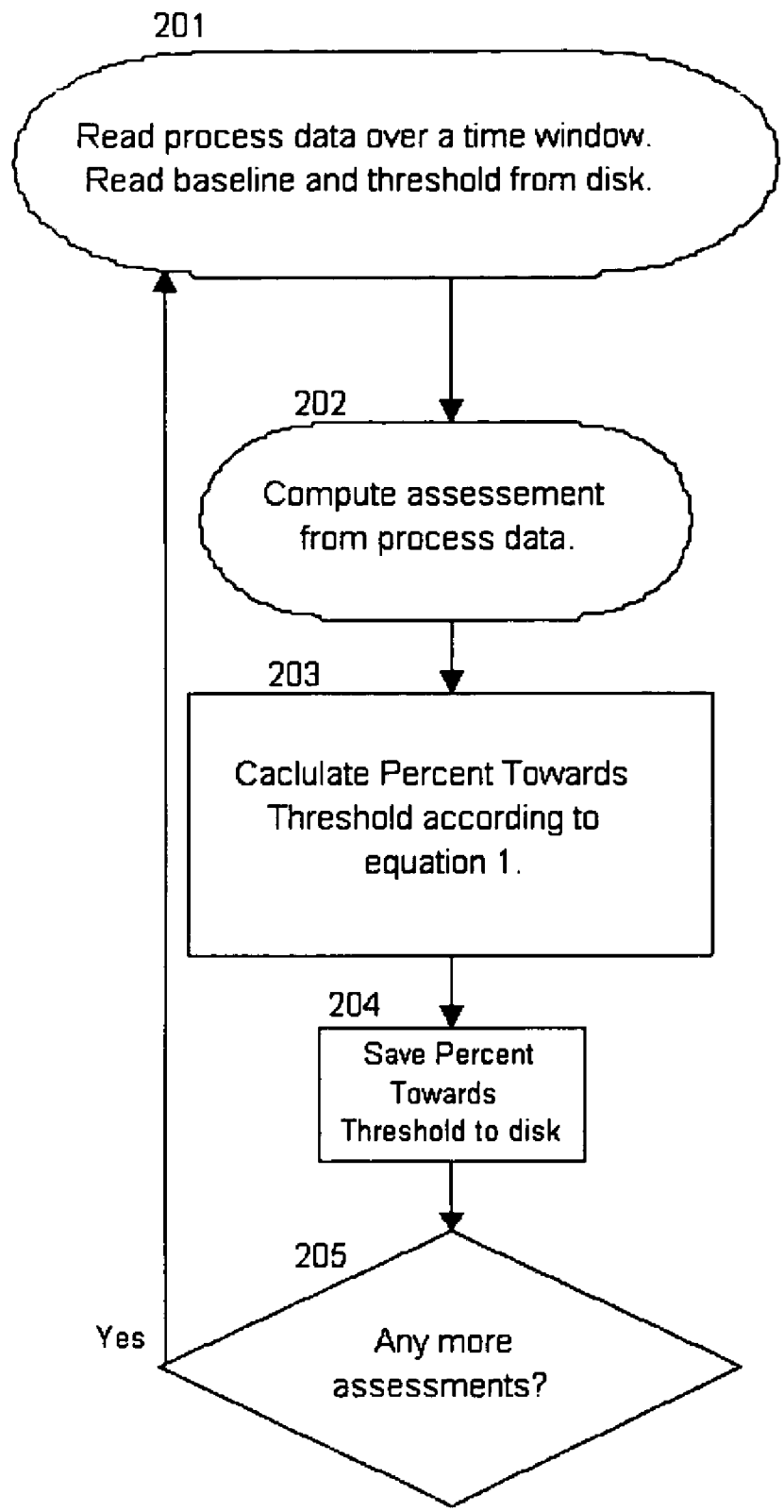
FIG. 2 is a flowchart of the process showing the calculation of Percent Towards Threshold.

FIG. 2 is a flowchart of how the application calculates Average Percent Towards Threshold. First, the time series of process data is read (201) from the disk. The baselines and threshold are also read from disk (201). The software processes this data to compute an assessment (202). Next the percent towards threshold is calculated from Equation 1 (203) and saved to disk (204).

$$\text{Percent Towards Threshold for this assessment} = (\text{Current Assessment} - \text{Baseline}) / (\text{Threshold} - \text{Baseline}) \times 100 \qquad \text{Equation 1}$$

These steps are repeated (205) for every assessment.

Figure 3:
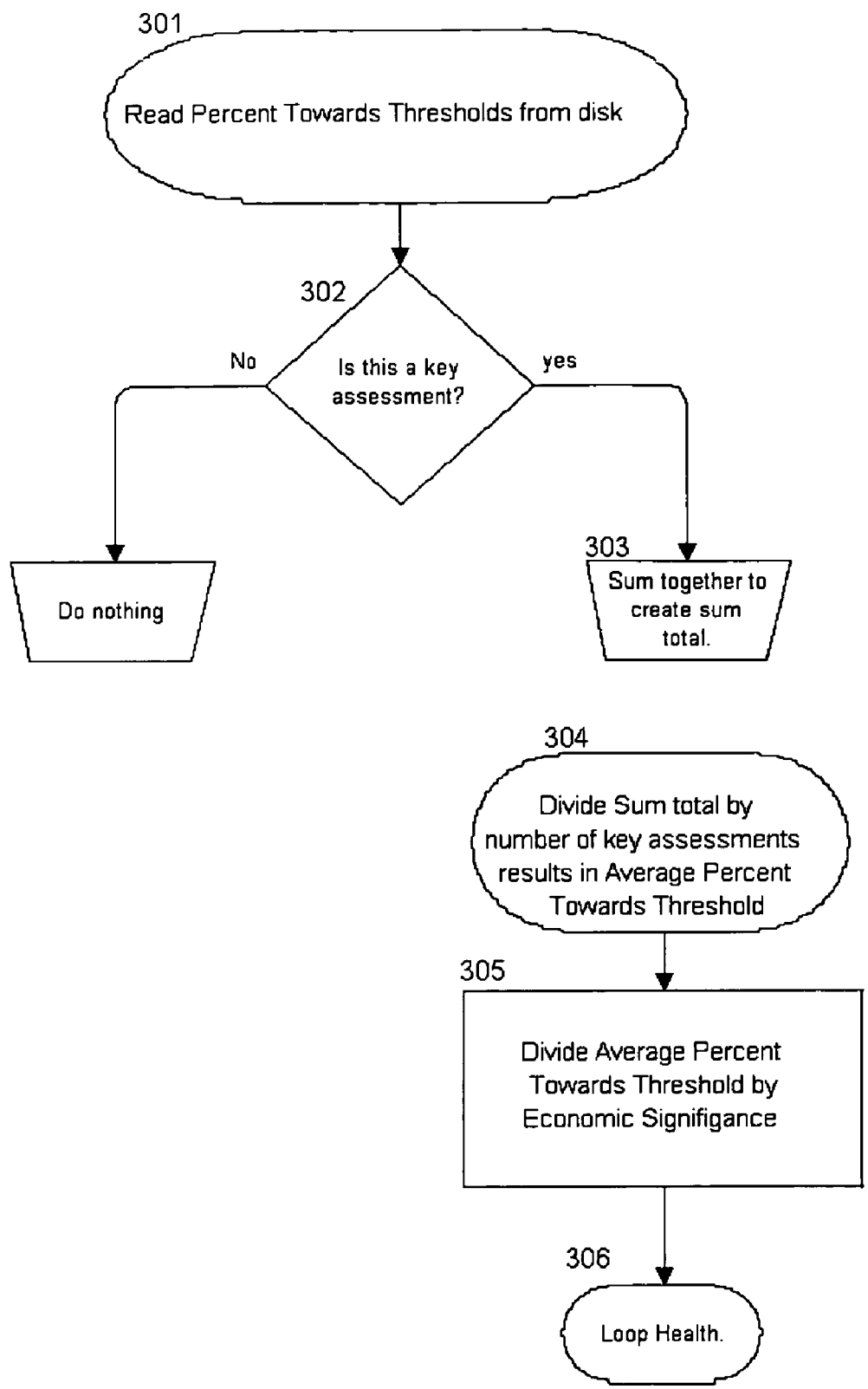
FIG. 3 is a flow chart of the process showing the role of the Economic Significance in the final calculation of loop health. Chart A is a typical screen shot from the program implementing the Invention process. The Chart shows various loops used in the industrial process and their average economic assessment, which indicates which loops need attention in order to improve their performance and the performance of the whole industrial process.

FIG. 3 is a flow chart showing the selection of key assessments and calculation of loop health. The Figure also shows how the sum of the Percent Towards Thresholds for key assessments is averaged and adjusted for economic significance to produce an overall measure of loop health. The Percent Towards Threshold for every assessment is read from disk (301). If an assessment is marked as key (302), the Percent Towards Threshold is summed together with the other Percents Towards Thresholds to create the Sum Total (303). Sum Total is then divided by the number of key assessments resulting in the Average Percent Towards Threshold (304). The Average Percent Towards Threshold is then divided by the Economic Significance (305). Each loop has its own Economic Significance. Examples could be 1, 2 or 4. The result is the loop health.

What follows is an example of the calculations based on data in the first four columns of Table 1:

TABLE 1

| Assessment | Current Assessment | Baseline | Threshold | Percent Towards Threshold |
|---|---|---|---|---|
| A | 2.1 | 0 | 4.73 | 44.4% |
| B | 24 | 30 | 11 | 31.6% |
| C | 4.3 | .1 | 3.56 | 121.4% |

Each row in Table 1 represents a key assessment. The column with the heading Current Assessment is calculated from plant data. Baseline and Threshold columns are read from the disk. In Table 1, the Percent Towards Threshold is calculated using Equation 1. The Average Percent Towards Threshold is the Average of the values in the last column and equal to 65.8%. If the economic significance on this loop were equal to 2.2 then the loop health would calculate out to be 29.9%.

Description—Preferred Embodiment

The preferred embodiment is within a computer program that has:
1. Access to a database containing assessments performed on the loop, baselines and thresholds.
2. Display mechanism for viewing the results. Preferably via a web browser interface as shown in Chart A.
3. Display mechanism that shows the results in a prioritized list as shown in Chart A.

Tests

The invention has been applied to several processing plants. One site is at Irving Pulp and Paper, St John, NB, Canada. The site has been running software that makes use of the invention since November 2002. The software is running on a Windows 2000 server computer communicating with a Honeywell TDC Distributed Control System. Clearly the use of the process of the Application when implemented by a computer produces practical, new, useful, tangible, and concrete results in the real world and in real time.

Additional Embodiments

The method for determining loop health can be adapted to work in a wide range of application programs which control or monitor processes in real time. Many programming language means can be used to program the method including Visual Basic, C, C++, Delphi, Java, C Sharp, ASP.NET and others known to those skilled in the art. An advantage of the present invention is that the method can be produced based on many programming languages which interact well with various application programs in various languages, and which may run better on the computers of particular users. The present invention is a method which is not limited to particular computer programming languages. Throughout this Application, various references to computer hardware and software may be terms which are used in a trademark sense, and may or may not be marks which are registered with the U.S. Patent and Trademark Office or state trademark offices.

The computer running the method is a personal computer, containing a communications card or other hardware device and server software that drives and communicates with the communications card. The personal computer may be running any operating system software means, for example Windows, Unix, Linux, or others known to those skilled in the art. The computer running the method could be any size computer.

The industrial control and monitoring equipment units could be any piece of industrial equipment which contains an embedded micro-processor and which is able to offload data values that represent the current state of an industrial process. Examples include machine tools, motor drives, robots, intelligent valves and pumps, telemetry outstations, programmable controllers and distributed control systems. Additionally this method for determining loop health could be looking at the health of computers systems, human systems, livestock systems or biological systems.

The invention of the Application includes a computer readable memory means such as a floppy disk, compact disc, hard disk, zip disk, magnetic tape, RAM, or similar data storage means known to those skilled in the art, which means contains the computer program process of the invention. The invention of the Application also includes the process of transmitting the computer program process of the invention in real time by means of wire, radio, laser beam, or other transmission means known to those skilled in the art. The invention of the Application also includes a computer means such as a microchip, personal computer, mainframe computer or any similar computer means knowing to those skilled in the art containing the computer program process of the invention. The operating system software means may include but is not limited to Windows, Unix, Linux, Apple and others known to those skilled in the art.

Alternative Embodiments

The process of the Application could be imbedded in a microprocessor or other on-chip processing.

CONCLUSIONS, RAMIFICATIONS AND SCOPE

A number of changes are possible to the methods described above, while still remaining within the scope and spirit of the invention. The invention can be applied to a wide variety of applications including industrial process control, medicine, human and animal health, health of individual systems in humans and animals, agriculture, health of computer systems, health of ship and aircraft navigation, the health of building heating ventilating and air conditioning systems, etc.

The specifics about the form of the invention described in this Application are not intended to be limiting in scope. The scope of the invention is to be determined by the claims, and their legal equivalents, not the examples given above.

I claim:

1. A method for determining the overall performance or health of a portion of a process control system comprising a control loop, wherein the determination method calculates a numerical value representing the overall performance of the control loop using one or more disparate performance assessments of the loop, and using a numerical value representing the relative economic significance of the portion of the process associated with the control loop.

2. A method for determining the overall performance or health of a control loop by combining one or more disparate assessments and a numerical value representing the economic significance of the loop to arrive at a single dimensionless value.

3. A method for determining the overall performance or health of a control loop comprising a portion of a process control system, comprising the steps of:
- (a) calculating the percent towards threshold for a performance assessment of the loop, wherein the calculation comprises subtracting a baseline value for a performance assessment of the loop from a current assessment value for that loop, then dividing that difference by the difference between the threshold value for that loop and the baseline value, and then multiplying the result by 100, and
- (b) repeating the steps in step (a) for every assessment of interest, and (c) determining which performance assessments are key to the performance of the loop, and
- (d) adding the percents toward threshold for every key assessment, and
- (e) dividing the quantity in (d) by the number of key assessments, and
- (f) dividing the quantity in (e) by the economic significance for the loop, wherein the economic significance for the loop is a relative number assigned to the loop, and wherein a lower number indicates greater relative economic importance of the loop for the whole control process, whereby the resulting single quantity is a relative indicator of performance or health of the loop, with smaller quantities indicating greater loop health, and vice versa.

4. A computer program designed to carry out the calculation process of claim 3.

5. A computer programmed with the program of claim 4.

6. A program storage means including bard disk, floppy disk, compact disk, zip disk, magnetic tape, RAM, or similar data storage means containing the program of claim 4.

7. The process of transmitting the program in claim 4 including using wire, radio, laser beam, or similar transmission means.

8. The program of claim 4, wherein the program language in which the program is written is selected from the group consisting of: Visual Basic, C, C++, Delphi, Java, C Sharp, or ASP.NET.

* * * * *